United States Patent [19]

Glabe et al.

[11] 4,178,369

[45] * Dec. 11, 1979

[54] FEEDING TURKEYS

[75] Inventors: Elmer F. Glabe, Northbrook, Ill.; Herbert J. Rebhan, New Richmond, Wis.

[73] Assignee: Food Technology Products, Chicago, Ill.

[ * ] Notice: The portion of the term of this patent subsequent to Dec. 11, 1996, has been disclaimed.

[21] Appl. No.: 897,113

[22] Filed: Apr. 17, 1978

Related U.S. Application Data

[63] Continuation-in-part of Ser. No. 786,419, Apr. 11, 1977, abandoned.

[51] Int. Cl.$^2$ .................................................. A23K 1/00
[52] U.S. Cl. ................................... 424/177; 424/317; 426/2; 426/807
[58] Field of Search .................. 426/2, 335, 532, 635, 426/807, 53, 54, 583, 630, 623; 424/177, 180, 311, 317

[56] References Cited

U.S. PATENT DOCUMENTS

| 3,925,559 | 12/1975 | Glabe et al. | 426/2 |
| 4,015,018 | 3/1977 | Glabe et al. | 426/2 |
| 4,016,294 | 4/1977 | Glabe et al. | 426/807 X |

Primary Examiner—R. B. Penland
Attorney, Agent, or Firm—Richard L. Johnston

[57] ABSTRACT

Mixed feeds used in feeding turkeys are improved by adding sodium diacetate and dehydrated whey in proportions sufficient to enhance feed efficiency.

6 Claims, No Drawings

FEEDING TURKEYS

RELATED CASES

This application is a continuation-in-part of United States Patent Application Serial No. 786,419 filed April 11, 1977, now abandoned.

BACKGROUND

In U.S. Pat. No. 4,015,018 issued Mar. 29, 1977, there is described a composition consisting essentially of sodium diacetate and dehydrated whey which is used to enhance the production of silage. This composition is a combination of edible non-toxic substances which aid in the fermentation of silage at an earlier stage in the fermentation process and inhibit the formation of undesirable butyric acid.

OBJECTS

One of the objects of the present invention is to provide new and useful mixed feeds for turkeys.

Another object is to provide a new and improved process of improving feed efficiency in the raising of turkeys. Other objects will appear hereinafter.

BRIEF SUMMARY OF THE INVENTION

In accordance with the invention mixed feeds used in feeding turkeys are improved by adding sodium diacetate and dehydrated whey in proportions sufficient to enhance feed efficiency.

DETAILED DESCRIPTION OF THE INVENTION

Sodium diacetate is non-toxic to man or animals since it metabolizes directly to carbon dioxide and water, leaving no residue in the tissues. It is not corrosive to equipment and may be safely handled by human beings using ordinary precautions.

Dehydrated whey is obtained by drying liquid whey which is a principal by-product of the cheese industry and is obtained after the removal of casein and fat from milk which is processed in making cheese. The residual liquid which contains protein, lactose and lactoalbumen as well as minor amounts of fat and minerals usually contains over 90% water which is largely removed by spray drying or some other form of dehydration to produce the dehydrated whey solids that are employed in the practice of the present invention. A typical analysis of dehydrated whey is as follows:

| | |
|---|---|
| Moisture | 4.5% |
| Protein* | 12.9% |
| Fat | 1.1% |
| Total Carbohydrate** | 73.5% |
| Ash (calcium, phosphorous, iron) | 8.0% |

*50% lactoalbumen
**the carbohydrate is virtually all lactose, only a fraction of a percent is dextrose.

A typical additive for use in preparing turkey feeds in accordance with the invention has the following compositions:

TABLE I

| Ingredients | Per Cent by Weight |
|---|---|
| Sodium diacetate | 50% |
| Spray-dried whey | 35.3% |
| Calcium carbonate | 8.2% |
| Bentonite (a silicate compound) | 5.0% |
| Mineral or Coconut Oil | 1.0% |
| Zeolex (sodium aluminosilicate anti-caking agent) | .50% |
| | 100.00% |

Of the above ingredients, sodium diacetate and whey are the only effective components for the purpose of the invention. Calcium carbonate and bentonite are anti-humectants for sodium diacetate and whey. They act as free-flowing agents permitting easy distribution. The coconut oil or mineral oil is an anti-dusting factor. Other anti-humectants and other anti-dusting factors which are edible inert substances as well as non-toxic can be employed. These substances generally have no substantial effect on the feed efficiency of the turkey feed. In general, the sodium diacetate will comprise 20–75% by weight of the additive composition and the weight ratio of sodium diacetate to dehydrated whey will be within the range of 25:1 to 1:4. The amount of dehydrated whey is preferably at least 3% by weight of the composition and the amount of inert ingredients preferably does not exceed 47% by weight of the composition.

In order to evaluate the invention tests were carried out with turkeys using standard turkey feeds with and without the addition of a sodium diacetate-dehydrated whey composition as typified by the compositions set forth in Table I.

Tom turkeys were placed in 15 pens with 150 turkeys in each pen.

In pens 1, 7 and 13 the turkeys were fed a standard starting feed for poults (Doboy Code 248) with nothing added.

In pens 2, 8 and 14 the turkeys were fed a standard medicated starting feed (Doboy Code 251) containing 0.375% butynorate and 50 grams per ton of bacitracin.

In pens 3, 9 and 15 the turkeys were fed the same feed used in pens 1, 7 and 13 with the addition of 2 pounds per ton (0.1% by weight) of the composition of Table I containing sodium diacetate and dehydrated whey.

In pens 4, 6 and 11 the turkeys were fed the same feed as in pens 1, 7 and 13 with the addition of 6 pounds per ton (0.3% by weight) of the composition of Table I.

In pens 5, 10 and 12 turkeys were fed the same turkey feed as in pens 1, 7 and 13 with the addition of 10 pounds per ton (0.5% by weight) of the composition of Table I.

For convenience, pens 1, 7 and 13 will be referred to as Group 1, which is a control group. Pens 2, 8 and 14 will be referred to as Group 2, which is a control group with a medicated feed. Pens 3, 9 and 15 will be referred to as Group 3. Pens 4, 6 and 11 will be referred to as Group 4. Pens 5, 10 and 12 will be referred to as Group 5.

The turkey poults were weighed after 4 weeks feeding and again after 8 weeks feeding and 12 weeks feeding. They were also weighed and examined after a 13–16 week period and after a 17–19 week period at which time the turkeys were ready for market.

After four weeks the poults were weighed and the feed conversion was calculated with the results shown in the following table:

TABLE II

(Four Weeks)

| Group | Birds/Group | Total Weights Pounds | Average Wt/Bird | Feed Conversion |
|---|---|---|---|---|
| 1 | 449 poults | 838 | 1.87 | 1.61 |
| 2 | 447 poults | 936 | 2.09 | 1.60 |
| 3 | 446 poults | 815 | 1.83 | 1.66 |
| 4 | 447 poults | 835 | 1.87 | 1.62 |
| 5 | 444 poults | 811 | 1.83 | 1.66 |

From the foregoing table it will be seen that the results obtained were not substantially different than those obtained with the control group.

After 8 weeks and 4 days the turkeys were again examined and weighed with the results shown in the following table:

TABLE III

(From Four Weeks through Eight Weeks-4 days)

| Group | Birds/Group | 4-8 Week Wt.Gain Pounds | 4-8 Week Feed Consumption Pounds | 4-8 Week Feed Conversion |
|---|---|---|---|---|
| 1 | 449 | 2232 | 4840 | 2.17 |
| 2 | 450 | 2520 | 6060 | 2.40 |
| 3 | 448 | 2229 | 5040 | 2.26 |
| 4 | 450 | 2248 | 5085 | 2.26 |
| 5 | 446 | 2085 | 4985 | 2.39 |

The cumulative data from 0-8 weeks is shown in the following table (Table IV):

TABLE IV

(0-8 weeks)

| Group | Wt. Gains Pounds | Wt. Per Bird Pounds | Feed Consumption | Feed Conversion |
|---|---|---|---|---|
| 1 | 3070 | 6.84 | 6190 | 2.02 |
| 2 | 3456 | 7.68 | 7560 | 2.19 |
| 3 | 3044 | 6.79 | 6390 | 2.10 |
| 4 | 3083 | 6.85 | 6435 | 2.09 |
| 5 | 2896 | 6.49 | 6335 | 2.19 |

Again it will be seen that the feed conversion in control group 1 was, if anything, slightly better than that in the other groups. The feed conversion in Groups 3, 4 and 5 was as good as, or slightly better than, the feed conversion in control group 2.

At the end of 8 weeks and 4 days the turkeys were divided into 15 groups of 75 and 3 groups constituting the remainder of approximately 375 turkeys per group. In some cases extra poults were added in order to keep the number of turkeys the same in the various groups. The groups of 75 turkeys are referred to herein as small pens and the groups of 375 turkeys are referred to herein as large pens 16, 17 and 18. These groups were divided into five categories, namely, group 6 consisting of small pens, 2, 9, 11, and large pen 16; group 7 consisting of small pens 3, 6 and 12 and large pen 17; group 8 consisting of small pens 4, 10 and 14 and large pen 18; group 9 consisting of small pens 1, 8 and 13; and group 10 consisting of small pens 5, 7 and 15.

Groups 6 and 7 were control groups and were fed a standard complete grower medicated turkey feed (Doboy Code 256) which contained 0.01875% Nitarsone and 25 grams per ton of bacitracin from zinc bacitracin. In group 6 the feed was in meal form and in group 7 it was in pellet form. Group 9 was fed the same feed in pellet form with the addition of 2 pounds per ton (0.1% by weight) of the sodium diacetate-dehydrated whey composition of Table I. Group 8 was fed a pelleted standard turkey feed substantially the same as the feed used for groups 6 and 7 but with 1⅓ pound per ton of p-ureidobenzene arsonic acid (Carb-O Sep) for prevention of blackhead and without the antibiotic bacitracin. Group 10 was fed with the same turkey feed as group 8 without the Carb-O Sep but with the addition of 6 pounds per ton (0.3% by weight) of the sodium diacetate-dehydrated whey composition of Table I. After the 12th week the turkeys were examined and weighed and the feed conversion calculated with the results shown in Table V.

TABLE V

| Group | Birds/Group Pounds | 8-12 wk. Wt. Gains- Pounds | 8-12 Wk Feed Consumption | 8-12 Wk. Feed Conv. |
|---|---|---|---|---|
| 6 | 223 | 5.45 | 3740 | 3.077 |
| 7 | 221 | 5.28 | 3475 | 2.978 |
| 8 | 225 | 5.55 | 3620 | 2.898 |
| 9 | 223 | 5.23 | 3350 | 2.872 |
| 10 | 221 | 5.50 | 3490 | 2.871 |
| Pens | | | | |
| 16 | 382 | 5.53 | 6550 | 3.10 |
| 17 | 364 | 5.03 | 5400 | 2.95 |
| 18 | 372 | 5.86 | 6320 | 2.90 |

It will be noted from Table V that the feed conversion in groups 9 and 10 where the feed contained the sodium diacetate-dehydrated whey composition was significantly better than the control groups 6 and 7 and large pens 16, 17 and 18.

Twelve weeks cumulative data is given in Table VI as follows:

Table VI

| Group | Wt/Bird Pounds | Feed Consumption Pounds | Feed Conversion |
|---|---|---|---|
| 6 | 12.29 | 6820 | 2.49 |
| 7 | 12.96 | 7190 | 2.51 |
| 8 | 12.04 | 6820 | 2.38 |
| 9 | 12.02 | 6530 | 2.44 |
| 10 | 12.35 | 6220 | 2.28 |

From the data given in Table VI it will be seen that groups 9 and 10 where the feed contained the sodium diacetate-dehydrated whey composition had better feed conversion than the control groups 6 and 7 and group 10 had better feed conversion than group 8.

From 13 through 16 weeks the turkeys were fed with the same standard feed (Doboy Code 258) except that, in group 8, 1⅓ pounds per ton of Carb-O Sep was added; in group 9, 2 pounds per ton of the sodium diacetate-dehydrated whey composition of Table I was added, and in group 10, 6 pounds per ton of the sodium diacetate-dehydrated whey compositon of Table I was added.

The results are given in Table VII.

TABLE VII

(13-16 weeks)

| Group | Birds/ Group | 16 Wk.Wt. Pounds | 13-16 Wk. Wt. Gains Pounds | 13-16 Wk.Feed Consumption Pounds | 13-16 Wk. Feed Conv. |
|---|---|---|---|---|---|
| 6 | 223 | 18.62 | 6.33 | 4660 | 3.30 |

TABLE VII-continued
(13-16 weeks)

| Group | Birds/Group | 16 Wk.Wt. Pounds | 13-16 Wk. Wt. Gains Pounds | 13-16 Wk.Feed Consumption Pounds | 13-16 Wk. Feed Conv. |
|---|---|---|---|---|---|
| 7 | 218 | 18.67 | 5.71 | 4100 | 3.29 |
| 8 | 220 | 18.27 | 6.23 | 4300 | 3.12 |
| 9 | 216 | 18.57 | 6.55 | 4200 | 2.97 |
| 10 | 214 | 19.79 | 6.44 | 4150 | 3.01 |
| Pens | | | | | |
| 16 | 371 | 18.17 | 5.70 | 7050 | 3.33 |
| 17 | 360 | 19.09 | 7.14 | 7800 | 3.04 |
| 18 | 359 | 19.15 | 6.39 | 6950 | 3.03 |

From the results in Table VII it will be seen that the feed efficiency was significantly better in groups 9 and 10 where the feed contained the sodium diacetate-dehydrated whey composition of Table I.

The tests were continued through the 19th week using a standard feed (Doboy Code 260) with the additions previously mentioned. At the end of that time the feed conversion for the whole 19 weeks was calculated with the results given in the following table (Table VIII).

TABLE VIII

| Group | Wt/Bird Pounds | Feed Consumption Pounds | Feed Conversion |
|---|---|---|---|
| 6 | 23.10 | 15105 | 2.97 |
| 7 | 23.16 | 14690 | 3.01 |
| 8 | 23.00 | 14520 | 2.98 |
| 9 | 23.54 | 14230 | 2.84 |
| 10 | 23.47 | 14250 | 2.86 |

It will be seen from Table VIII that the feed conversion for groups 9 and 10 where the feed contained the sodium diacetate-dehydrated whey composition of Table I was significantly better than the controls (groups 6 and 7) or group 8 which contained the Carb-O Sep.

When the turkeys were processed the turkeys in the single pens in groups 9 and 10 where the feed contained the sodium diacetate-dehydrated whey composition were classified 81.6% and 89.6% Grade A respectively, as contrasted with 80.8% Grade A in group 6, 74.2% grade A in group 7 and 80.7% Grade A in group 8. The mortality in groups 7, 8, 9 and 10 was approximately the same over the entire period. The mortality in group 6 was significantly less which may have been due to the fact that the turkeys in group 6 were fed meal rather than pellets. The mortality was significantly higher in pens 16, 17 and 18 although these pens had satisfactory and in some cases significantly higher Grade A turkeys. None of the pens, however, had as many Grade A turkeys percentagewise as those in group 10 where the number of Grade A turkeys was approximately 90% which is excellent.

As previously indicated standard turkey feeds were used in evaluating the invention. These feeds contained a source of carbohydrates, a source of protein, a source of fat, a source of fiber, a source of minerals, a source of vitamins, and in some cases a source of disease inhibitors for diseases such as blackhead and coccidiosis. In general, these feeds have a minimum crude protein analysis of at least 18% by weight, a minimum crude fat analysis of at least 2.5% by weight, and a minimum crude fiber analysis of at least 4.5% by weight. In some cases antibiotics such as bacitracin from zinc bacitracin are added. Also, in some cases disease inhibitors are added for the prevention of blackhead and coccidiosis. For example, 2-isopropyl-1-methyl-5-nitroimidazole (Ipropan), for prevention of blackhead, 4-nitrophenylarsonic acid (Histostat) for the prevention of blackhead, p-ureido benzene arsonic acid (Carb-O Sep) for the prevention of blackhead and dibutyltindilaurate (Tinostat) for the prevention of coccidiosis.

The amount of sodium diacetate in the total feed is preferably within the range of 0.025 to 0.25% and the quantity of dehydrated whey is preferably at least 4% by weight of the total sodium diacetate and whey. Especially good results have been obtained where the quantity of sodium diacetate is approximately 0.1-0.15% by weight of the turkey feed.

The mixed feeds eaten by turkeys to which the sodium diacetate and whey composition is added are normally dry, unfermented mixtures consisting essentially of weight percentages of the following components:

| Component | Weight Percent |
|---|---|
| Defluroinated phosphate | 0.5-5 |
| | 0.05-1.0 |
| Vitamin Supplement | 0.5-2.5 |
| Meat and Bone Meal | 0-25 |
| Soybean Meal (44% protein) | 10-60 |
| Feeding Lime | 1.5-4 |
| Standard Middlings | 0-25 |
| Alfalfa Meal (17% protein) | 0-10 |
| Corn | 5-50 |
| Animal Fat | 0-10 |
| Dyna Sol (magnesium and phosphate supplement) | 0-5 |
| Sodium chloride | 0.1 |
| Trace Mineral | 0.1 |

In the practice of the invention it has been found that the addition of the sodium diacetate and dehydrated whey composition not only enhances feed efficiency but also reduces mortality and enhances quality.

To illustrate these advantages of the invention a control flock of 1,514,308 turkeys were fed with a standard turkey feed of the type previously described without the addition of the sodium diacetate and dehydrated whey composition. A second flock of 1,617,921 turkeys was fed the same type of turkey feed as the control flock with the addition of two pounds per ton of complete feed of the sodium diacetate-dedhydrated whey additive of Table I in approximately 75% of the turkey rations. A third flock of 1,567,743 turkeys was fed the same type of mixed turkey feed with the addition of two pounds per ton of complete feed of the sodium diacetate-dehydrated whey composition of Table I in all turkey rations. In the control flock 93.2% of the turkeys lived, 3.6% were condemned, and 75.4% were Grade A turkeys. In the second flock 94.2% of the turkeys lived, 3.0% were condemned, 81.9% were Grade A turkeys and there was an improved feed efficiency or conversion of 4.4% over the control flock. In the third flock 94.1% lived, 2.1% were condemned, 86.3% were Grade A turkeys and there was an improved conversion or feed efficiency of 5.0%. The overall value increase of the second and third flocks as compared to the control flock was 5.8:1.

It will be understood that the invention is susceptible to other variations and modifications in the manner of its practical application.

In the specification and claims, the terms "feed efficiency" and "feed conversion" refer to pounds of feed required to produce one pound of live weight gain.

The invention is hereby claimed as follows:

1. A process of improving feed efficiency in the raising of turkeys which comprises feeding turkeys with a mixed turkey feed containing 0.1% to 0.3% by weight of sodium diacetate and dehydrated whey wherein the weight ratio of sodium diacetate to dehydrated whey is within the range of 25:1 to 1:4 thereby to enhance the feed efficiency of the feed.

2. A process as claimed in claim 1 wherein said sodium diacetate and said dehydrated whey are added to said mixed turkey feed as a mixture in which the quantity of sodium diacetate is 20% to 75% by weight and the quantity of dehydrated whey is at least 3% by weight, the remainder being edible inert substances that have no substantial effect on the feed efficiency of the turkey feed.

3. A process as claimed in claim 2 wherein the quantity of sodium diacetate is approximately 50% by weight of said mixture and the quantity of dehydrated whey is approximately 35% by weight of said mixture.

4. A feed consisting essentially of a mixed turkey feed to which has been added 0.1% to 0.3% by weight of sodium diacetate and dehydrated whey wherein the weight ratio of sodium diacetate to dehydrated whey is within the range of 25:1 to 1:4 thereby to enhance the feed efficiency of said feed.

5. A feed as claimed in claim 4 wherein the quantity of sodium diacetate is approximately 0.1-0.15% by weight of said feed.

6. A feed as claimed in claim 4 wherein said mixed turkey feed consists essentially of a source of carbohydrates, a source of protein, a source of fat, a source of fiber, a source of minerals, a source of vitamins, and a source of disease inhibitors, the minimum crude protein analysis being 18% by weight, the minimum crude fat analysis being 2.5% by weight, and the minimum crude fiber analysis being 4.5% by weight.

* * * * *